Sept. 4, 1956

M. D. KAMEN ET AL 2,761,757

PROCESSES OF RECOVERING URANIUM

Filed April 18, 1944

2 Sheets-Sheet 1

INVENTORS.
MARTIN D. KAMEN
ABEL De HAAN
BY
Roland A. Anderson
ATTORNEY.

Sept. 4, 1956　　　M. D. KAMEN ET AL　　　2,761,757
PROCESSES OF RECOVERING URANIUM
Filed April 18, 1944　　　　　　　　　　　　2 Sheets-Sheet 2

INVENTORS.
MARTIN D. KAMEN
ABEL De HAAN
BY
Roland A. Anderson
ATTORNEY.

United States Patent Office 2,761,757
Patented Sept. 4, 1956

2,761,757

PROCESS OF RECOVERING URANIUM

Martin D. Kamen, Berkeley, Calif., and Abel De Haan, Jr., Oak Ridge, Tenn., assignors to the United States of America as represented by the United States Atomic Energy Commission Application April 18, 1944, Serial No. 531,574

9 Claims. (Cl. 23—14.5)

The present invention relates to processes of reclaiming uranium from a calutron and more particularly to improvements in certain steps of the process disclosed in the copending application of James M. Carter and Martin D. Kamen, Serial No. 532,159, filed April 21, 1944.

It is an object of the invention to provide an improved process of reclaiming uranium from a calutron.

Another object of the invention is to provide an improved process of recovering metallic uranium from the collector of a calutron upon which the metallic uranium is deposited.

A further object of the invention is to provide an improved process of recovering metallic uranium deposited upon the collector of a calutron, in which uranium is removed from the collector by electrolysis.

A still further object of the invention is to provide a process of reclaiming uranium from an electrolyte into which it has been electrolyzed in which the electrolyte is treated in an electrolytic cell.

Figure 1:
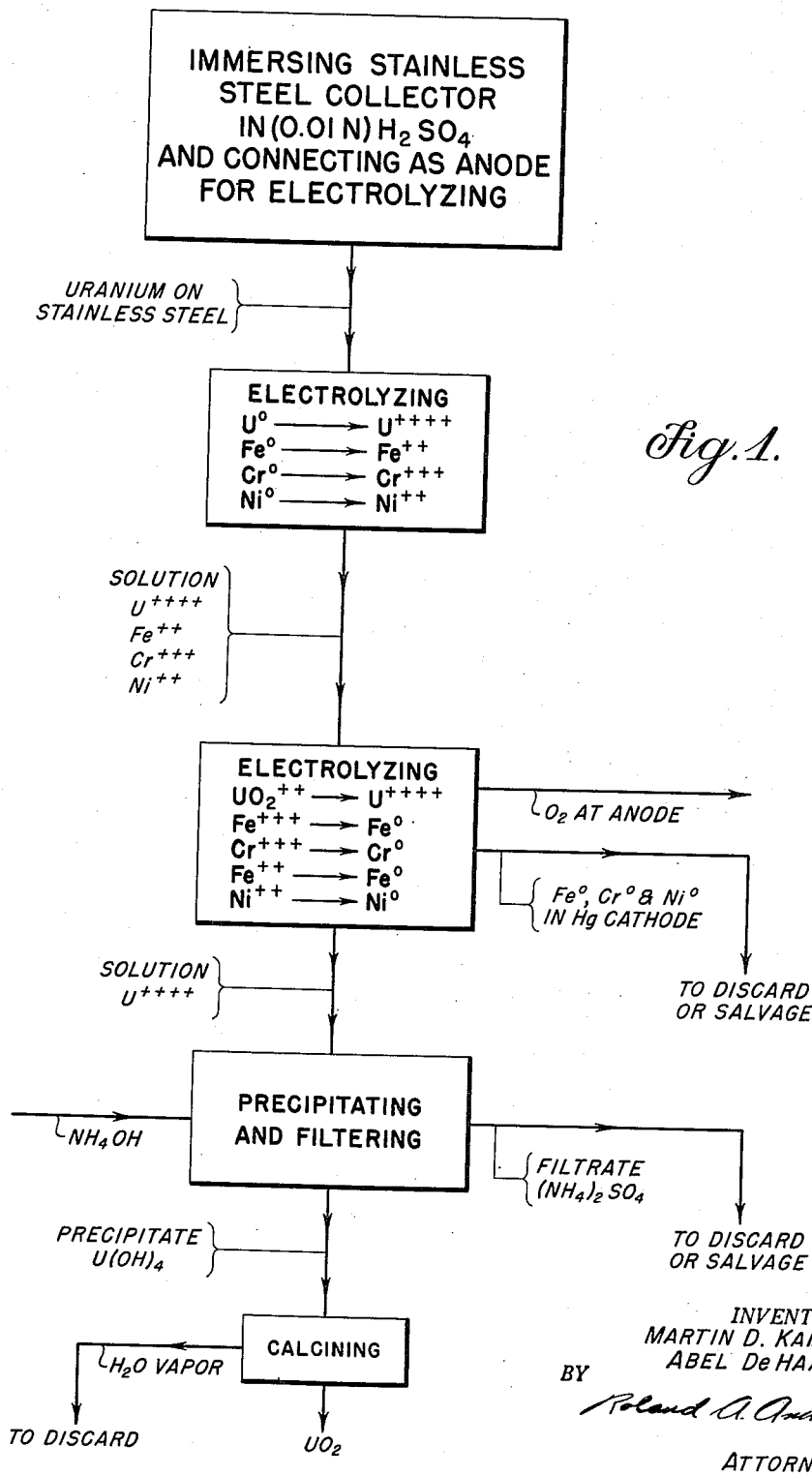
Figure 2:
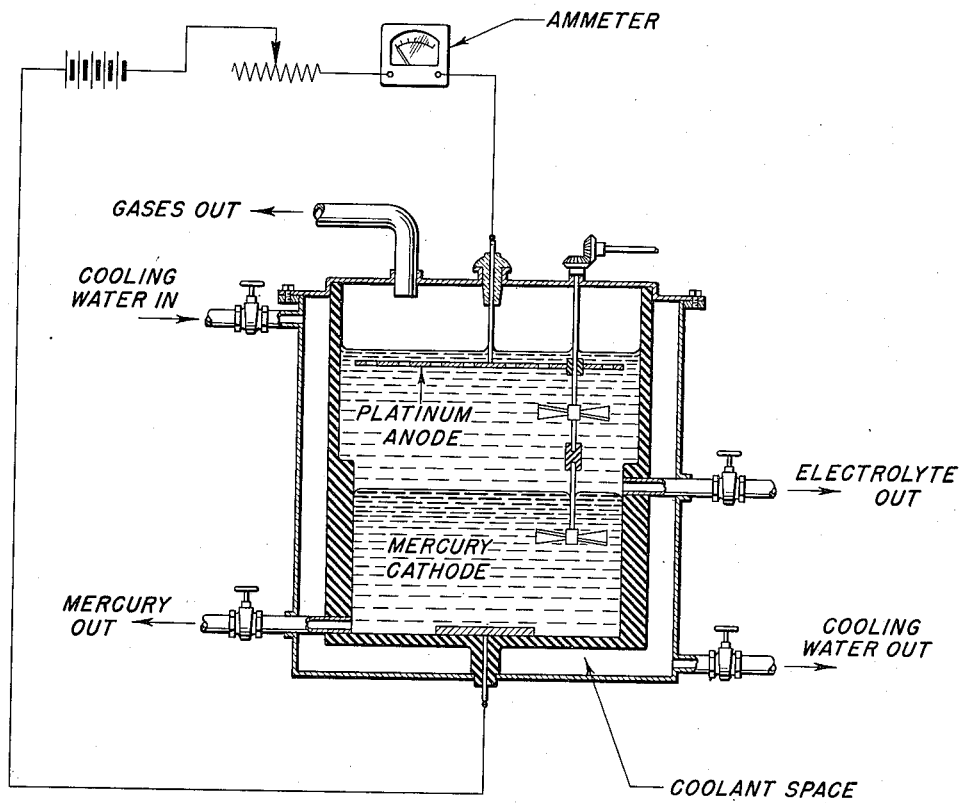

The invention both as to its organization and method of operation, together with further objects and advantages thereof, will best be understood by reference to the following specification taken in conjunction with the accompanying drawings in which Figure 1 is a flow diagram illustrating the present process as applied to the recovery of the residue of UCl$_4$ from the parts of the calutron disposed in the source region thereof and the initial steps of the subsequent purification of the uranium;

Figure 2 illustrates an electrolytic cell in which electrolysis operations of the process of the invention may be carried out.

At the outset, it is noted that a "calutron" is a machine of the character disclosed in the copending application of Ernest O. Lawrence, Serial No. 557,784, filed October 9, 1944, which issued as U. S. Patent No. 2,709,222 on May 24, 1955. The aforesaid machine is employed to separate the constituent isotopes of an element and more particularly to increase the proportion of a selected isotope in an element containing several isotopes in order to produce the element enriched with the selected isotope.

Such a calutron essentially comprises means for vaporizing a quantity of material containing an element which is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the selected isotopes thus concentrated, thereby to produce a deposit of the element enriched with the selected isotope.

When such a calutron is employed to separate the isotopes of uranium, the un-ionized portion of said vaporized material is deposited in the source region of the calutron and upon stainless steel surfaces while the ionized portion is deposited partially on the collector and partially upon various surfaces of the vacuum tank and other interior surfaces dependent upon the type of ion which is produced by said ionization and upon the operating characteristics of said calutron. It has been found convenient to employ uranium tetrachloride as the material being vaporized and, accordingly, there will be a deposit of the residue thereof formed in the source region of said calutron while metallic uranium comprising substantially only $U^{238}$ will be deposited in one pocket of the collector of said calutron and uranium enriched with $U^{234}$ and/or $U^{235}$ will be deposited in the second pocket of said collector.

Considering now the details of the recovery of the metallic uranium deposited on the stainless steel surfaces of the collectors of the calutron, reference is made to the flow diagram illustrated in Fig. 1. A pocket of the collector of the calutron is immersed in an electrolyte comprising about 0.1 to 0.01 N $H_2SO_4$, or the liner of a pocket of the collector is first removed from the collector proper and then immersed in the electrolyte mentioned. In any case, the pocket, or the liner of the pocket, of the collector of the calutron is contacted with the sulfuric acid electrolyte in which it is immersed. Then an electrolytic cell is produced, the pocket, or the liner of the pocket, of the collector constituting the anode of the electrolytic cell; the electrolytic cell is also provided with a cathode which may take the form of a suitable plate of stainless steel. Preferably, the anode and the cathode have approximately equal areas and are both immersed in the sulfuric acid electrolyte, as previously noted. The anode and the cathode of the electrolytic cell are then connected to a suitable source of current and a voltage of several volts is applied therebetween, causing electrolysis to take place at a current density of about 0.1 to 0.3 ampere per cm.$^2$ at the anode. The current traversing the electrolytic cell plates off of the anode, and into solution in the electrolyte, the deposit of metallic uranium along with various impurities including iron, chromium and nickel; the impurities mentioned being introduced into the electrolyte due to the fact that the anode is formed of stainless steel which comprises the metals mentioned. Also, the electrolytic current effects transfer of $H^+$ ion to the cathode and $SO_4^{--}$ ion to the anode, whereby $H_2$ is liberated at the cathode and $O_2$ is liberated at the anode in a well-known manner. The uranium, iron, chromium and nickel are electrolyzed from the anode into the electrolyte in their lower valence states, whereby the following ions are introduced in the electrolyte: $U^{++++}$, $Fe^{++}$, $Cr^{+++}$, $Ni^{++}$. The $U^{++++}$ does not plate out of the electrolyte on to the cathode, as it possesses a high overvoltage; whereas the $Fe^{++}$, $Cr^{+++}$ and $Ni^{++}$ plate out of the electrolyte on to the cathode to some extent, although most of these ions remain in the electrolyte.

After all of the metallic uranium deposited on the anode has been plated off into the electrolyte the voltage applied to the electrolytic cell is removed; the anode comprising the pocket, or the liner of the pocket, of the collector is removed from the electrolyte; and the electrolyte containing the uranous, ferrous, chromic and nickelous ions is ready for further treatment.

At this point the electrolyte may be combined, if desired, with a solution obtained by washing the parts in the source region of a calutron to dissolve the uranium tetrachloride residue deposit formed thereon which solution contains impurities similar to those contained in the electrolyte. The solution may first be subjected to a preliminary partial purification process including oxidation with $H_2O_2$ and precipitation of the uranium as ammonium diuranate together with ferric hydroxide and chromic hydroxide by means of ammonia, which precipitate is filtered from the solution. This preciptate may then be dissolved in about 1N $H_2SO_4$ and the solution combined with the aforesaid electrolyte to form a composite solution. The sulfuric acid concentration of composite said electrolyte or of said composite solution is first adjusted to an appropriate range 0.5 to 3 N $H_2SO_4$, and preferably 1 N $H_2SO_4$, by adding water or $H_2SO_4$ thereto as required. The solution is then placed in an electrolytic cell and employed therein as the electrolyte. Preferably, such electrolytic cell is of the type illustrated in Fig. 2 which comprises a platinum anode, a mercury cathode, an arrangement for vigorously agitating the electrolyte and the mercury cathode, a water-cooling arrangement for the cell, and an arrangement for drawing off and separately collecting, after electrolysis, the electrolyte and the mercury of the cathode. After the electrolyte has been placed in the electrolytic cell the associated circuit is closed, whereby a voltage of several volts is applied between the anode and the cathode, causing electrolysis to take place at a current density of about 0.1 ampere per cm.$^2$ at the anode; the anode and the cathode of the electrolytic cell being of approximately equal areas. When the electrolyte is thus electrolyzed the contained ions are reduced, as indicated below:

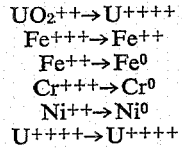

$$UO_2{}^{++} \rightarrow U^{++++}$$
$$Fe^{+++} \rightarrow Fe^{++}$$
$$Fe^{++} \rightarrow Fe^0$$
$$Cr^{+++} \rightarrow Cr^0$$
$$Ni^{++} \rightarrow Ni^0$$
$$U^{++++} \rightarrow U^{++++}$$

As a result of said electrolysis only the uranous ion $U^{++++}$ remains in the electrolyte and any contained iron, chromium, and nickel ions, regardless of whether they are in the higher or the lower oxidation states, are completely reduced to metallic iron, chromium, and nickel, which impurities are accumulated in the mercury cathode. More specifically, as the ferric, ferrous, chromic, and nickelous ions are completely reduced by electrolysis, they are carried into the mercury cathode, whereby the electrolyte is purified to contain only the uranous ion, $U^{++++}$, after the electrolysis is complete. Also, the electrolytic current effects transfer of $H^+$ ion to the cathode and $SO_4{}^{--}$ ion to the anode, whereby some $H_2$ is liberated at the cathode and $O_2$ is liberated at the anode in a well-known manner. The $U^{++++}$ ion is not plated out of the electrolyte into the mercury cathode, as it possesses a high over-voltage; whereas the $Fe^0$, $Cr^0$, and $Ni^0$ are plated out of the electrolyte into the mercury cathode, as previously noted.

After the electrolysis has been completed the mercury cathode in the electrolytic cell is drawn off and subjected to salvage treatment, whereby it may be re-conditioned for use. Also, the electrolyte is drawn off and subjected to ammonia treatment, either with $NH_3$ gas or $NH_4OH$, whereby $U(OH)_4$ is precipitated away from the $$(NH_4)_2SO_4$$

in the solution. The solution is then filtered and the uranous hydroxide precipitate is washed with water containing about 1% $NH_4OH$ and 1% $(NH_4)_2SO_4$ to eliminate occluded impurities. The filtrate containing the ammonium sulfate is then discarded or subjected to salvage treatment, in order to recover any uranium contained therein; and the purified precipitate of $U(OH)_4$ is calcined in a non-oxidizing atmosphere, such as nitrogen or hydrogen, at approximately 250° C. in order to produce $UO_2$. Such purified $UO_2$ is then available for commercial use.

The present process of recovering metallic uranium from collectors of calutrons is very effective, in view of the fact that the quantities of the various impurities obtained incident to the recovery are considerably limited, due to the nature of the electrolytic process. For example, considerably smaller quantities of the impurities mentioned are introduced in the electrolyte along with the uranium, when the electrolytic process of recovering the uranium from the collector of a calutron is employed, than are introduced in an acid wash when the latter process of recovering the uranium from the collector of the calutron is employed. Thus, not only is the subsequent purification process considerably simplified, but additional life is given to the collectors of the calutrons.

In view of the foregoing it is apparent that there has been provided an improved process of recovering metallic uranium values from deposits formed with the collector of a calutron by the impingement thereon of uranium ions at the high velocities employed therein.

Also it will be understood that the present process is independent of the compound of uranium which is treated in the calutron and that a compound of uranium other than $UCl_4$ may be treated in the calutron. For example, the calutron, as well as the conversion steps of the process, may be modified, whereby $UCl_6$, $UBr_4$, etc. may be treated.

The term "uranium" is employed in the present specification and claims in a generic sense, i. e., as applying to uranium whether in elemental form or in the form of its compounds, unless indicated otherwise by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. The process of recovering metallic uranium values from deposits formed with a metal body by the impact of uranium ions at high velocities commensurate with large scale electromagnetic isotope separations comprising immersing said body in a sulfuric acid solution to form the anode of an electrolytic cell, electrolyzing the solution in said cell to form a mixture of $Fe^{+++}$, $Ni^{++}$, $Cr^{+++}$ and $UO_2{}^{++}$ ions in said solution from said body, electrolyzing the resultant solution in a second electrolytic cell having a mercury cathode to reduce the $UO_2{}^{++}$ ions to $U^{++++}$ ions and the remaining ions of said mixture to the elemental state thereupon to be absorbed in said mercury cathode, prceipitating said $U^{++++}$ ions as $U(OH)_4$ with ammonia, and calcining said $U(OH)_4$ to produce $UO_2$.

2. In a process for recovering uranium values from deposits formed with a metallic body by the impact of uranium ions at high velocities commensurate with large scale electromagnetic isotope separations comprising arranging said body as an anode in an electrolytic cell with dilute $H_2SO_4$ as the electrolyte, passing an electrical current through said cell to form from said body a mixture of $Fe^{+++}$, $Cr^{+++}$, $Ni^{++}$ and $UO_2{}^{++}$ ions in said electrolyte, then electrolyzing said electrolyte in an electrolytic cell having a mercury cathode to reduce said $UO_2{}^{++}$ ions to $U^{++++}$ ions and said $Fe^{+++}$, $Cr^{+++}$ and $Ni^{++}$ ions to the metallic state thereupon to be absorbed in said mercury cathode, and recovering the uranium present as $U^{++++}$ ions in said solution.

3. In a proces for recovering uranium values from deposits formed with a metallic body by impingement of uranium ions at high velocities commensurate with large scale electromagnetic isotope separations the steps comprising arranging said body as the anode of an electrolytic cell with $H_2SO_4$ having a concentration of about 0.1 to 0.01 N as the electrolyte, electrolyzing into said electrolyte a mixture of $Fe^{+++}$, $Cr^{+++}$, $Ni^{++}$, and $UO_2{}^{++}$ ions from said body, then electrolyzing said electrolyte in an electrolytic cell having a mercury cathode to reduce the $UO_2{}^{++}$ ions to $U^{++++}$ ions and the other ions to the elemental state and absorb the elemental Fe, Cr, and Ni in said mercury cathode, precipitating said $U^{++++}$ ions as $U(OH)_4$ with ammonia, and calcining said $U(OH)_4$.

4. In a process for recovering uranium from deposits formed with a metallic body by the impact of uranium ions at high velocities commensurate with large scale electromagnetic isotope separations the steps comprising immersing said body in a dilute sulfuric acid electrolyte in an electrolytic cell with said body forming the anode, passing an electrical current through said cell at a current density of about 0.1 ampere per cm² to form a mixture of $Fe^{+++}$, $Cr^{+++}$, $Ni^{++}$ and $UO_2^{++}$ ions in said electrolyte from said body, then electrolyzing said electrolyte in an electrolytic cell having a mercury cathode to reduce the $UO_2^{++}$ ions to $U^{++++}$ ions and the other ions to the elemental state and absorb the elemental Fe, Cr and Ni in said mercury cathode, precipitating said $U^{++++}$ ions as $U(OH)_4$ with ammonia, and calcining said $U(OH)_4$.

5. The process for recovering uranium values from deposits formed with a metallic body by the impingement of uranium ions at high velocities commensurate with large scale electromagnetic isotope separations comprising, immersing said body as the anode of an electrolytic cell having a sulfuric acid electrolyte, passing a current through said electrolyte at a current density of about 0.1 to 0.3 ampere per cm² at the anode to electrodissolve the components of said body yielding a mixture of $Fe^{+++}$, $Cr^{+++}$, $Ni^{++}$, and $UO_2^{++}$ ions in said electrolyte, then electrolyzing said electrolyte in a second cell with a mercury cathode to reduce the aforesaid ions to elemental Fe, Cr, Ni, and $U^{++++}$ ions, respectively and to absorb said elemental materials in said mercury cathode, precipitating the $U^{++++}$ ions from the solution as $U(OH)_4$, and calcining said $U(OH)_4$.

6. The process for recovering uranium values from deposits formed with a stainless steel body by the impact of uranium ions at high velocities commensurate with large scale industrial electromagnetic isotope separations comprising immersing said body in a dilute sulfuric acid electrolyte as an anode of an electrolytic cell, passing a current through said cell to oxidize and dissolve into the electrolyte said uranium values together with components of said body as impurities, transferring said electrolyte to a second cell with a mercury cathode, then electrolyzing said electrolyte to reduce said impurities to the metallic state and absorb the reduced impurities in said mercury cathode while leaving the uranium values in solution, precipitating said uranium values as $U(OH)_4$ from said electrolyte, and calcining said $U(OH)_4$ to form $UO_2$.

7. The process for recovering uranium values from deposits formed with a stainless steel body by the impact of uranium ions at high velocities commensurate with large scale electromagnetic isotope separations comprising immersing said body in about 0.1 N sulfuric acid to form the anode of an electrolytic cell, passing a current through said cell to remove said deposits from said body forming a mixture of $Fe^{+++}$, $Cr^{+++}$, $Ni^{++}$ and $UO_2^{++}$ ions in the electrolyte, then transferring said electrolyte to a second electrolytic cell having a mercury cathode, passing a current through said second cell to reduce said ions and adsorb Fe, Cr and Ni in said mercury cathode, precipitating said reduced $UO_2^{++}$ ions from said electrolyte, and calcining the resultant precipitate to form $UO_2$.

8. The process of recovering uranium 238 values from deposits formed with a stainless steel body by the impact of uranium ions at high velocities commensurate with large scale electromagentic isotope separations comprising immersing said body as the anode of an electrolytic cell having sulfuric acid of a concentration in the range of about 0.1 to 0.01 N as the electrolyte, passing a current at a current density in the range of about 0.1 to 0.3 amp. per cm² at the anode through said cell to remove said deposits from said body forming a mixture of $UO_2^{++}$, $Fe^{+++}$, $Cr^{+++}$ and $Ni^{++}$ ions in said electrolyte, then electrolyzing said electrolyte in an electrolytic cell having a mercury cathode to reduce the $Fe^{+++}$, $Cr^{+++}$ and $Ni^{++}$ ions to the metals and absorb said metals in said mercury cathode and to reduce said $UO_2^{++}$ ions to $U^{++++}$ ions, precipitating said $U^{++++}$ ions as $U(OH)_4$ with ammonia, and calcining said $U(OH)_4$.

9. In a method for reclaiming uranium values from deposits formed with a stainless steel body by the impact of uranium ions at high velocities commensurate with large scale electromagnetic isotope separations, the step comprising electrolyzing said body arranged as the anode of an electrolytic cell having an electrolyte comprising sulfuric acid having a concentration in the range of about 0.1 to 0.01 N and at an electrolytic current density in the range of about 0.1 to 0.3 amp. per cm.² at the anode to remove said deposits from said body thereby forming a mixture of $UO_2^{++}$, $Fe^{+++}$, $Cr^{+++}$ and $Ni^{++}$ ions in said electrolyte.

References Cited in the file of this patent

UNITED STATES PATENTS

| | | |
|---|---|---|
| 1,462,421 | Pearson et al. | July 17, 1923 |
| 2,316,579 | Hall | Apr. 13, 1943 |
| 2,316,750 | Ambrose | Apr. 20, 1943 |

FOREIGN PATENTS

| | | |
|---|---|---|
| 485,089 | Great Britain | May 13, 1938 |

OTHER REFERENCES

Smith: Am. Chem. Jour., vol. 329–340 (1879).

Wherry et al.: Jour. Am. Chem. Soc. 29, pp. 806–8 (1907).

Zeitschrift für Elektrochemie, vol. 19 (1913), pp. 115–6 of an article by U. Shorgi.

Pierle: Jour. Phy. Chem. 23, pp. 517–553 (1919).

Chemistry, by J. W. Mellor, vol. 12 (1932) pp. 13, 26, 40, 41, 80.

Uranium and Atomic Power, by Jack De Ment and H. C. Dake, Chemical Pub. Co. (1941, Brooklyn, N. Y., p. 189).